G. H. GILMAN.
DRILLING ENGINE.
APPLICATION FILED APR. 3, 1913. RENEWED DEC. 7, 1914.
1,326,399.
Patented Dec. 30, 1919.
3 SHEETS—SHEET 1.
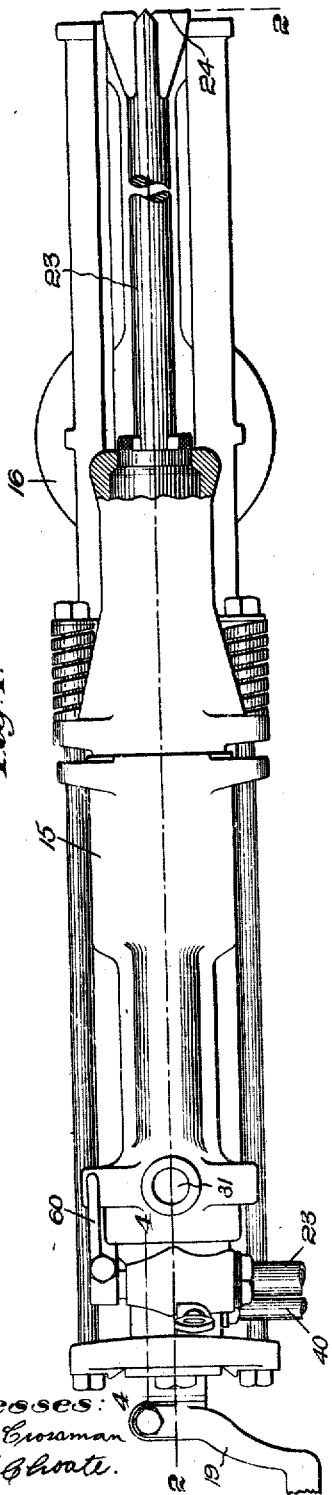
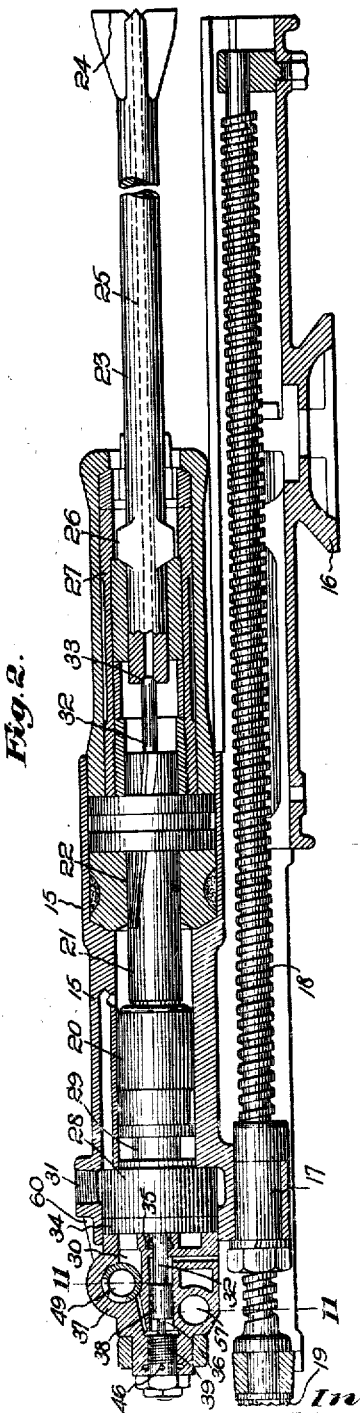
Witnesses:
Horace A. Crosman
Carl L. Choate.
Inventor:
George H. Gilman.

G. H. GILMAN.
DRILLING ENGINE.
APPLICATION FILED APR. 3, 1913. RENEWED DEC. 7, 1914.
1,326,399.
Patented Dec. 30, 1919.
3 SHEETS—SHEET 2.
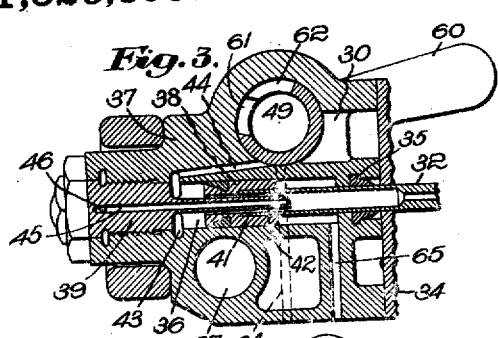
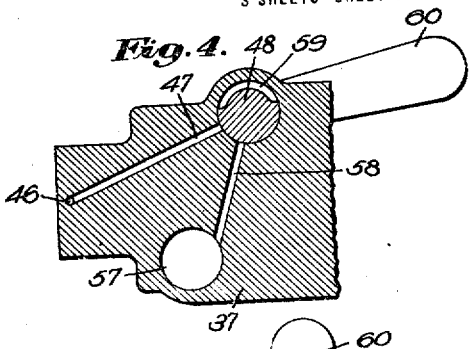
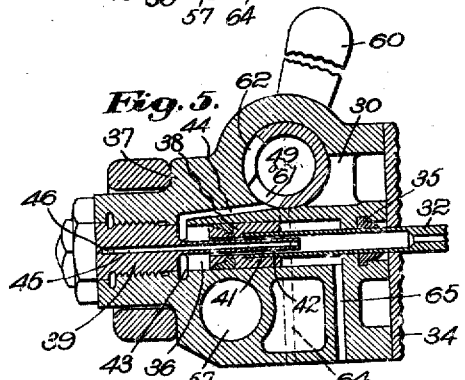
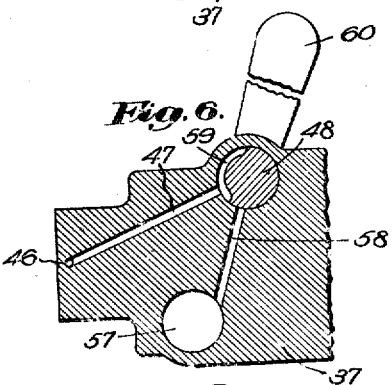
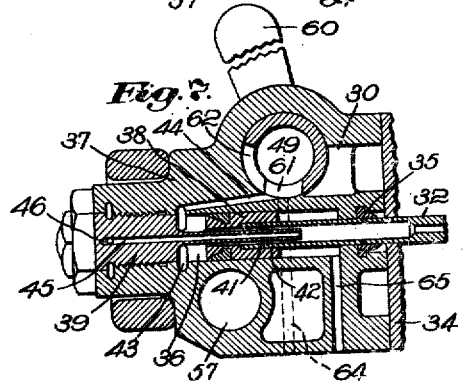
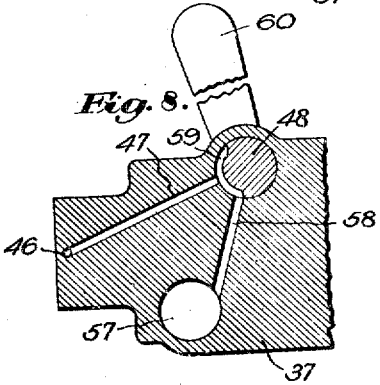
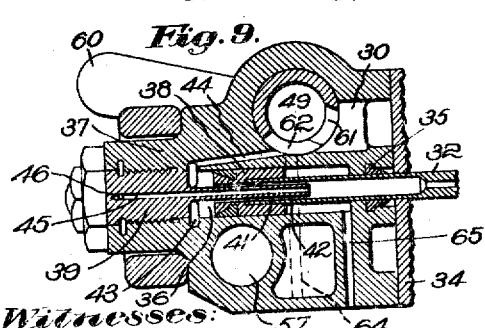
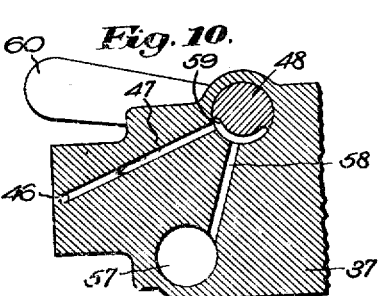
Witnesses:
Horace A. Crossman
Carl L. Choate
Inventor:
George H. Gilman
by Emery Booth Janney Varney
Attys G. H. GILMAN.
DRILLING ENGINE.
APPLICATION FILED APR. 3, 1913. RENEWED DEC. 7, 1914.

1,326,399.

Patented Dec. 30, 1919.
3 SHEETS—SHEET 3.

Witnesses:
Horace A. Crossman
Carl L. Choate.

Inventor:
George H. Gilman
by Emery Booth Janney Varney
Attys.

UNITED STATES PATENT OFFICE.

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

DRILLING-ENGINE.

1,326,399.   Specification of Letters Patent.   Patented Dec. 30, 1919.

Application filed April 3, 1913, Serial No. 758,563.  Renewed December 7, 1914.  Serial No. 876,004.

*To all whom it may concern:*

Be it known that I, GEORGE H. GILMAN, a citizen of the United States, and a resident of Claremont, Sullivan county, State of New Hampshire, have invented an Improvement in Drilling-Engines, of which the following description, in connection with the accompanying drawings, is a specification, like characters on the drawings representing like parts.

This invention relates to cutting tools, and more especially, though not exclusively, to rock drilling machines of that class in which liquid and gaseous fluid may be supplied to the drilled hole to lay the dust, cleanse the drilled hole, and expel the cuttings therefrom.

My invention will be best understood by reference to the following specification, when taken in connection with the accompanying drawings showing two illustrative embodiments thereof, while its scope will be more particularly pointed out in the appended claims.

In the drawings:

Figure 1 is a plan of a rock drilling machine embodying my invention;

Fig. 2 is a central longitudinal section, partly in elevation, on line 2—2 of Fig. 1;

Fig. 3 is a detail central longitudinal section on an enlarged scale of the rear end of the machine, showing the throttle valve in its closed position;

Fig. 4 is a detail sectional view on an enlarged scale on line 4—4 of Fig. 1, showing the throttle valve in its closed position;

Fig. 5 is a sectional view similar to Fig. 3, except that the valve is shown turned to admit gaseous fluid to the drill-bit;

Fig. 6 is a sectional view similar to Fig. 4, but showing the valve in the position shown in Fig. 5;

Fig. 7 is a sectional view similar to Fig. 5, except that the valve is shown turned farther to admit liquid to the drill-bit, while still maintaining the supply of gaseous fluid;

Fig. 8 is a sectional view similar to Fig. 6, but showing the valve in the same position as in Fig. 7;

Fig. 9 is a sectional view similar to Fig. 7, except that the valve is turned still farther to admit actuating fluid to the cylinder, while still maintaining the flow of gaseous fluid and the liquid to the drill-bit;

Fig. 10 is a sectional view similar to Fig. 8, but showing the valve in the same position as in Fig. 9;

Figure 11:
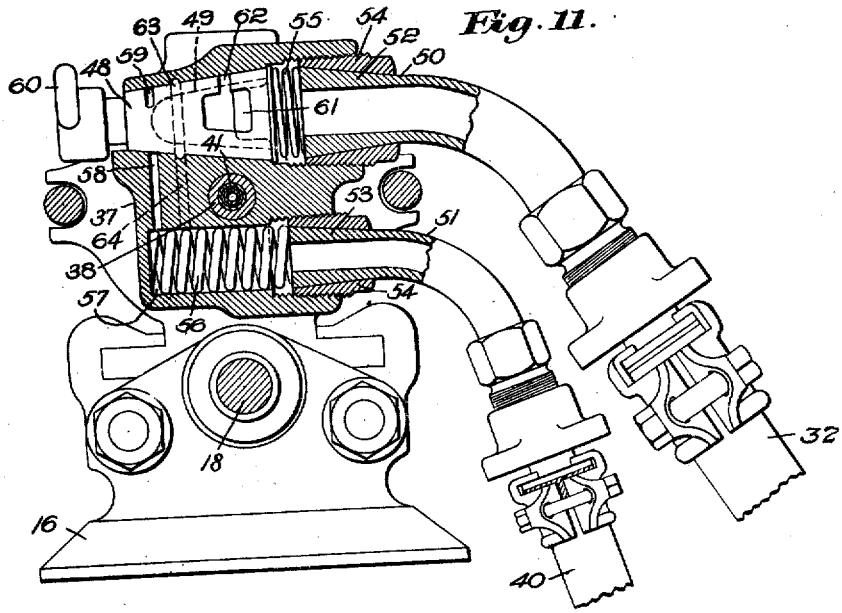
Fig. 11 is a sectional view on an enlarged scale on line 11—11 of Fig. 2, looking toward the right.

Referring to the drawings, and to the embodiment of my invention which I have selected for illustrative purposes, I have there shown a rock drilling machine of the indirect or hammer type, but it will be distinctly understood that most of the features of my present invention are applicable to drilling machines of other types. While I have shown my invention as embodied in a hammer drill of the "mounted" type, it is not limited in its application to tools of this particular type.

Referring to the embodiment which I have selected for the purposes of exemplification, 15 is a cylinder mounted upon a usual shell 16, and adapted to be fed toward or from the work, by means of a nut 17, feed-screw 18, and handle 19. Working in the cylinder is a hammer piston 20, having a contracted plunger, or striking portion, 21, working in a contracted portion 22 of the forward end of the cylinder, and adapted to deliver a hammer blow upon the inner end of a suitable drill-bit 23.

While the drill-bit may be of any other appropriate material, it is herein shown as comprising a suitable piece of steel having appropriate cutting edges 24, and provided with a fluid supply passage 25 extending from end to end. The drill-bit is herein provided with a plurality of lugs 26, by means of which it is held against rotative movement, but permitted to move longitudinally within a suitable holding device, herein comprising a rotative sleeve 27. Any suitable means, either manual or automatic, may be employed for rotating the drill-bit, but herein there is shown an automatic rotating device similar to that shown in my United States Letters Patent, No. 1,034,010, dated July 30, 1912. Since the rotating mechanism forms no essential part of my present invention, it will be unnecessary herein to describe the same, it being understood, however, that the connection between the piston and the rotating sleeve is such that the reciprocatory movement of the piston is accompanied by a step-by-step rotative movement of the sleeve, which in turn causes a step-by-step rotative movement of the tool.

The movements of the piston hammer are herein controlled by a suitable pressure-fluid actuated valve 28. This may be of any suitable form, but herein I have shown a valve of the type disclosed in Letters Patent No. 1,095,848, granted to me May 5, 1914. This valve is annular, or shell-like, in form, and located preferably at the rear of, and in line with, the piston, a rear projecting portion 29 of which is adapted to enter the valve, and partly close the same on the back stroke of the piston.

The valve controls the admission of pressure fluid to opposite ends of the cylinder from a pressure supply space 30, as well as the exhaust from opposite ends of the cylinder through an exhaust outlet 31. Steam, or other gaseous fluid, of any other suitable form, but preferably compressed air, is supplied to the pressure supply space 30 by a flexible pipe 32, and is supplied to the tool under the control of the throttle valve which I will presently describe.

To supply the hollow drill-bit with liquid or gaseous fluid under pressure, or both, I may employ a supply tube 32, the forward end of which (see Fig. 2) is preferably beveled and hardened, and seated against a beveled recess 33 in the inner end of the shank of the drill-bit, so as to bring the passage of the tube into alinement with the passage in the bit. The piston hammer reciprocates upon the tube with a sliding fit, and preferably so that no pressure fluid, or any substantial amount thereof, can pass from the cylinder chamber to the space in front of the piston plunger 21 and at the inner end of the drill-bit shank.

The rear portion of the supply tube projects axially through the annular valve 28, and through the back of a valve plate 34, and a suitable packing 35, into a chamber 36 formed in a headblock 37. Within the chamber 36, the end of the tube has attached thereto, either by brazing or by any other suitable means, a sleeve 38 forming a piston-like head, the rear end of which is subjected to pressure which tends to press the piston and attached tube forward. Into the rear end of the chamber, there is inserted a plug or nipple 39, having suitable provision for introducing water or other fluid into the supply tube, such water being herein fed thereto under pressure from any suitable source, by means of a flexible pipe 40 under the control of suitable means, which I will presently describe.

The nipple 39 is herein provided with a tube herein in the form of a tubular extension 41, which projects a sufficient distance into the supply tube 32, so that when the latter moves to and fro, the tubular extension of the nipple will always be within the supply tube. This extension, however, preferably does not fit the bore of the supply tube and its piston, but is separated therefrom by an annular space 42, communicating with the chamber 36 at the rear of the piston 38. This chamber is connected by an annular groove 43 to a supply port 44. The nipple 39 is provided with an axial passage 45, having communication through a passage 46 with a port 47.

During the operation of the tool, water may be admitted through the nipple 45, and passing centrally through the supply tube 32 is united with the live air, or other pressure fluid which enters the tube about the tubular extension 41 of the nipple. The relation of the tubular extension to the supply tube is such as to provide for a siphoning, or ejector action, and the gaseous fluid and water passing downwardly from the tube are delivered to the bottom of the drilled hole through the hollow drill steel.

As the hammer piston continues to strike the shank of the drill-bit, the latter is subjected to more or less vibration and longitudinal movement, which tends to open the joint between the end of the tube and the drill steel. The disclosed arrangement, however, is such that as the drill steel moves, the tube automatically follows such movement and maintains its seat thereagainst under the pressure of the air in the rear end of the chamber 36, thus automatically maintaining under all conditions of use a sealed joint, and preventing the escape of water at said joint and into the space surrounding the inner end of the drill steel.

In order that the supply of motive fluid to the cylinder, the supply of liquid to the drilled hole, and the supply of gaseous fluid to the drilled hole, may be coördinately controlled, I preferably place them under the control of a single valve 48, which, as will presently appear, in its closed position shuts off entirely the supplies of gaseous fluid and liquid from the tool, but which may be operated to admit gaseous fluid to the supply tube, then to admit liquid to the supply tube while maintaining the supply of gaseous fluid, and finally to admit actuating fluid to the cylinder while still maintaining the supplies of gaseous fluid and liquid to the supply tube in the consecutive order named. This will insure the operator against removing the drill steel from the machine before the hole is properly cleaned of its cuttings, and will also reduce the work of changing the drill steel, inasmuch as the operator will not have to shut off the liquid and gaseous fluid in two separate operations, as has heretofore been necessary.

To these ends, the throttle valve 48, already referred to, is provided with an internal chamber 49, communicating at all times with the air pipe line 32 through a suitable coupling 50, while the valve receives its supply of water from the water pipe line 40 through a suitable coupling 51. While these couplings may be of any other suitable construction, they preferably enter into the side of the head-block of the tool, so that the latter may be conveniently operated very close to the roof of the tunnel, or mine. The couplings 50 and 51 are herein in the form of elbows having tapered terminal portions 52 and 53, respectively, seated in correspondingly tapered bushings 54, threaded into the head-block 37. The swiveled coupling 50 is held seated in its bushing by a suitable spring 55, bearing at one end against the inner end of said coupling, and at its other end against the inner end of the throttle valve 48, the latter being also tapered and the spring thus serving to assist the air pressure in keeping the valve firmly seated in its chamber in the head-block. In a similar manner, the swiveled coupling 51 is held seated in its bushing 54 by a suitable spring 56, bearing at one end against the inner end of said coupling, and at its other end against the inner end of a chamber 57, in which the spring is placed.

Leading from the water supply chamber 57 just referred to is a passage or port 58, which may be placed in communication with the port 47, already described, by means of a segmental groove 59, formed in the periphery of the throttle valve 48. When the latter is closed, as shown in Figs. 3 and 4, the supply of water to the supply tube 32 is shut off, but when the valve is turned by means of a suitable handle 60 from the position shown in Figs. 3 and 4 to the position shown in Figs. 7 to 10, inclusive, the groove 59 serves to place the port 58 in communication with the port 47, thus admitting water to the supply tube. The valve 48 is provided with a port 61 leading from its internal chamber 49, and this port may be placed in communication with the pressure fluid supply space 30 hereinbefore referred to, thereby to supply actuating fluid to the cylinder of the tool. A port 62, also leading from the internal chamber 49 of the valve and incidentally communicating with the port 61, is provided to establish communication between the pressure fluid supply space within the valve and the port 44, thereby to admit gaseous fluid to the supply tube 32.

The groove 59, port 61, and port 62, are so related to one another (see Figs. 2 to 10, inclusive), that by turning the valve contra-clockwise from the position shown in Figs. 3 and 4, pressure fluid is first admitted to the chamber 36 and to the supply tube 32, thereby causing the tube to be seated at its forward end against the inner end of the drill steel, and at the same time causing a stream of the pressure fluid to be supplied through the hollow drill steel to the bottom of the drilled hole. When the valve is turned farther, (see Figs. 7 and 8) the supply of pressure fluid to the supply tube is maintained, and liquid is admitted thereto. When the valve is turned still farther (see Figs. 9 and 10), pressure fluid is admitted to the supply space 30, leading to the cylinder, while the supplies of pressure fluid and liquid to the supply tube 32 are still maintained. The tool is now in full operation, and gaseous fluid and liquid are admitted through the hollow drill steel to the bottom of the drilled hole, thereby laying the dust, cleansing the drilled hole, and forcibly expelling the cuttings therefrom. The valve may be closed by simply a reversal of the foregoing operation, thereby shutting off the main actuating fluid passage first, then the liquid supply, and finally the supply of gaseous fluid to the tube.

It will now be evident that by the use of a single throttle valve, I am enabled to coordinately control the supplies of liquid and gaseous fluid to the drilled hole, the supply of actuating fluid to the cylinder, and the pressure fluid which serves to seat the supply tube against the drill-bit. That is to say, this valve controls conjointly the functions of the tool, and therefore obviates the necessity of using separate valves to shut off the air and water in two separate operations, as is the case in all drilling machines of the prior art of which I am aware.

As a means for preventing any possible leakage of liquid from the port 58 and groove 59 along the valve and into the ports 61 and 62 and the chamber 49, I may provide a circumferential groove 63 in the head-block and encircling the valve at a point intermediate the water and air ports, and a drain port 64 leading to the atmosphere. As a means for preventing any possible accumulation of water in the forward end of the chamber 36, I may provide a drain port 65 leading therefrom to the atmosphere. This port will also prevent the trapping of any air in the forward end of the chamber, which would interfere with the action of the piston 38.

Figure 12:
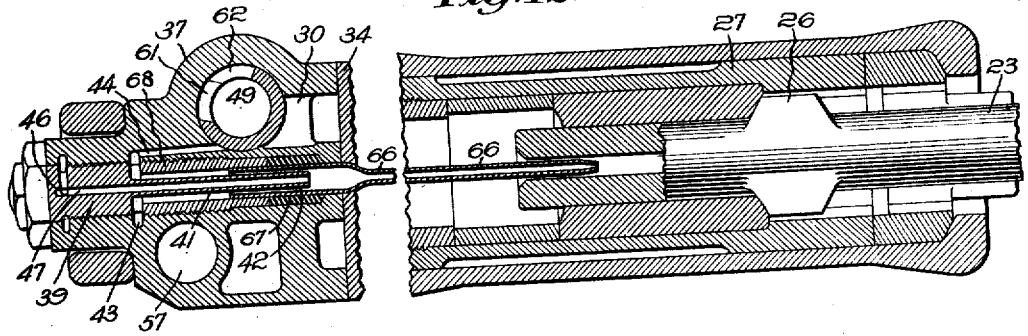
Fig. 12 is a central longitudinal sectional view, showing a slight modification of the drilling machine in which the fluid supply tube is fixed. In other respects, this form of my invention is exactly similar to the form shown in Figs. 1 to 11, inclusive.

Referring now to the modification shown in Fig. 12, the construction shown therein is exactly similar to that hereinbefore described, with the exception that instead of providing a movable supply tube seated against the inner end of the drill steel, I provide a fixed supply tube 66 projecting loosely at its forward end into the bore of the drill-bit, and having its rear end encircled by a suitable packing ring 67 held under compression against the circumferential wall of the tube by a bushing 68 threaded into the headblock of the tool, and taking the place of the piston described in connection with the first form. In other respects, the construction and mode of operation of the modified construction shown in Fig. 12 is essentially the same as that of the form shown in Figs. 1 to 10, inclusive, and a further description of the same will be unnecessary.

The construction last described is not claimed herein, being covered by the claims of a divisional application filed July 24, 1919, Serial No. 313,120.

While I have herein shown and described two specific embodiments of my invention for illustrative purposes, and have disclosed and discussed in detail the construction and arrangement incidental to two specific applications thereof, it is to be understood that the invention is limited neither to the mere details or relative arrangement of parts, nor to its specific embodiments herein shown, but that extensive deviations from the illustrated forms or embodiments of the invention may be made without departing from the principles thereof.

Having thus described my invention, what I claim and desire by Letters Patent to secure is:

1. A rock-drilling machine comprising, in combination, a cylinder, a hammer piston, a hollow drill-bit, a fluid supply tube passing longitudinally through said piston hammer, means for automatically seating the end of said tube against said drill-bit, and means for coördinately controlling the seating of said tube, and supplies of pressure fluid and liquid to the interior of said tube.

2. A rock-drilling machine comprising, in combination, a cylinder, a hammer piston, a member adapted to be struck by said piston having a fluid supply passage extending therethrough, a fluid supply tube in line with said member, means for automatically pressing said tube to a seat against said member, and means for conjointly controlling the seating of said tube, and supplies of pressure fluid and liquid to the interior of said tube.

3. A rock-drilling machine comprising, in combination, a cylinder, a hammer piston, a member adapted to be struck by said piston having an axial fluid passage therethrough, a fluid supply tube having a jointed connection with said member, means for sealing the joint by fluid pressure agaist the tube, and means for conjointly controlling the pressure fluid sealing said joint and supplies of pressure fluid and liquid to the interior of said tube.

4. A rock-drilling machine comprising, in combination, a cylinder having a chamber at its rear end, a hammer piston, a hollow drill-bit, a fluid supply tube passing longitudinally through said hammer piston and having a piston slidably mounted in said chamber, means for conducting pressure fluid to the last-mentioned piston, and means for coördinately controlling the supply of pressure fluid to said chamber and a supply of liquid to the interior of said supply tube.

5. A rock-drilling machine comprising, in combination, a cylinder, a hammer piston, a hollow drill-bit, a fluid supply tube passing longitudinally through said piston hammer, means for automatically seating the end of said tube against said drill-bit, and means for coördinately controlling the seating of said tube, and supplies of pressure fluid to said cylinder, and liquid to the interior of said tube.

6. A rock-drilling machine comprising, in combination, a cylinder, a hammer piston, a hollow drill-bit, a fluid supply tube passing longitudinally through said piston hammer, means for automatically seating the end of said tube against said drill-bit, and means for coördinately controlling the seating of said tube, and supplies of pressure fluid to said cylinder, and pressure fluid and liquid to the interior of said tube.

In testimony whereof, I have signed my name to this specification, in the presence of two subscribing witnesses.

GEORGE H. GILMAN.

Witnesses:
ROBERT H. KAMMLER,
THOMAS B. BOOTH.